March 24, 1936. H. E. BUTLER 2,034,940
DOMESTIC COOKING RECEPTACLE
Filed June 15, 1935
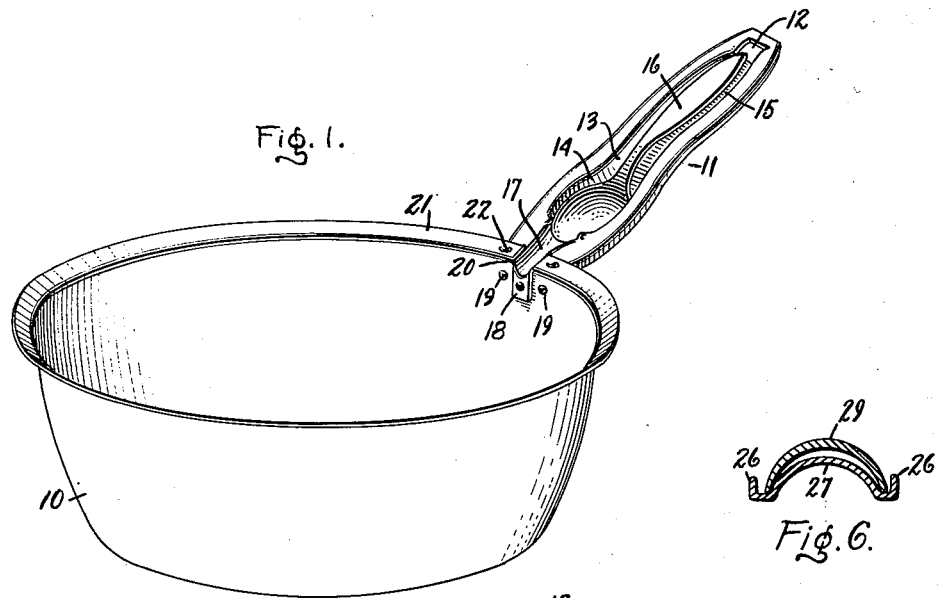
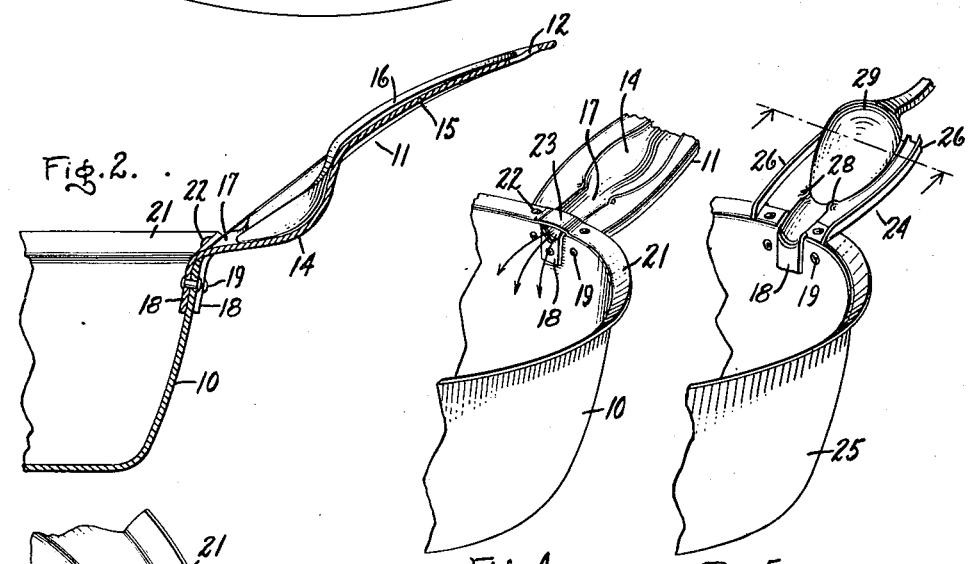
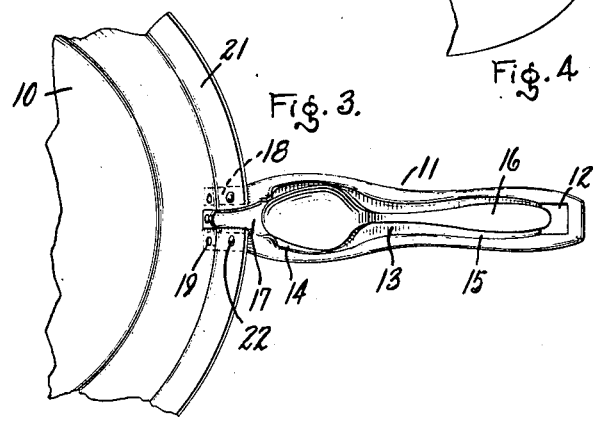
Inventor:
Henry E. Butler,
by Alfred E Bober
His Attorney.

Patented Mar. 24, 1936

2,034,940

UNITED STATES PATENT OFFICE 2,034,940

DOMESTIC COOKING RECEPTACLE

Henry E. Butler, Scotia, N. Y.

Application June 15, 1935, Serial No. 26,822

7 Claims. (Cl. 53—8)

The present invention relates to domestic cooking receptacles and the like such as comprise a pan having a handle for lifting it.

In cooking in such receptacles a spoon is used often for stirring from time to time the contents being cooked in the pan, and when not being used the spoon must be either left in the pan or laid some place adjacent to the pan where it is handy so it may be readily picked up again for stirring the contents of the pan. If left in the pan, the spoon handle becomes hot making its use difficult. If laid adjacent to the pan, for instance on a shelf of the stove, contents from the pan clinging to the spoon get on the stove, and in addition, the spoon may be easily knocked off the stove onto the floor. As a result, the disposition of the spoon is often a problem and often causes annoyance to the user.

The object of the present invention is to provide an improved construction and arrangement in a domestic cooking receptacle whereby the spoon may be held by the receptacle in a firm and satisfactory manner without being left in the contents of the pan and whereby any material from the pan clinging to the spoon and dripping from it will run back into the pan.

A further object of my invention is to provide a spoon holding means for a pan having a handle which forms a part of the handle of the pan and can be added thereto at little if any additional cost.

For a consideration of what I believe to be novel and my invention attention is directed to the following specification and the claims appended thereto.

In the drawing, Fig. 1 is a perspective view of a domestic cooking receptacle embodying my invention; Fig. 2 is a detail sectional view thereof; Fig. 3 is a top plan view of Fig. 2; Fig. 4 is a fragmentary perspective view of a modification; Fig. 5 is a fragmentary perspective view of a further modification, and Fig. 6 is a sectional view on line 6—6, Fig. 5.

Referring to the drawing, 10 indicates the pan of a domestic cooking receptacle and 11 indicates the handle. In the end of the handle is an opening 12 which may be used for hanging the receptacle on a hook.

According to my invention I provide the handle 11 with a depression 13 extending longitudinally thereof and having a contour such that a spoon will fit therein and be held thereby. The depression has an enlarged lower portion 14 to receive the bowl of a spoon and a longitudinally extending portion 15 to receive the handle of a spoon. In Figs. 1, 2 and 3, 16 indicates a spoon resting in the handle. The enlarged lower portion 14 of the depression is connected to the interior of the pan by a groove or passage 17. Thus any material dripping from the spoon when it is laid in the depression may run back into the pan. Groove or passage 17 is formed on the lower portion of the handle so that it is, in substance, a part of depression 13.

In Figs. 1, 2 and 3 the handle 11 is fastened to the pan 10 by three ears 18, two of which are positioned outside the pan and the third inside. The ears may be fastened to the rim of the pan in any suitable manner, such as by welding, rivets or the like. In the present instance they are shown as being fastened by rivets 19. The portion of the handle forming groove or passage 17 is located in a recess formed in the rim of the pan as is indicated at 20, the rim of the pan and the adjacent portion of the flange 21 which extends around the pan being cut away at this point. The inner end of the handle extends under flange 21 and the edges of the flange at the cut away portions are riveted or otherwise fixed thereto as is indicated at 22 so as to form a good connection between the handle and the pan.

In Fig. 4 is shown a modification wherein the rim of the pan only is cut away for the handle, the flange being left continuous as is indicated at 23. Otherwise the arrangement shown in Fig. 4 may be the same as that shown in Figs. 1 to 3 inclusive, and the same reference numerals have been applied to corresponding parts.

In Figs. 5 and 6 is shown a modification adapted to hold a spoon in an up side down position. The handle 24 of the pan 25 is provided at its lower end with a flange 26 on each side and between the flanges 26 is an upwardly extending portion 27 over which the bowl of a spoon is adapted to fit in an up side down position. If found desirable for holding the spoon in position, beads 28 may be provided for engagement with the tip of a spoon. In Figs. 5 and 6, 29 indicates a spoon in position on the handle of the pan. Otherwise the construction shown in Figs. 5 and 6 may be the same as that shown in Figs. 1, 2 and 3.

In the use of the invention, the spoon, after being used to stir the contents of the pan, is laid on the handle as shown in the drawing. The contour of the depression in the handle is such that an average size spoon will lie therein, the spoon being held from sliding downward due to its tip engaging the lower end of depression as is shown clearly in the drawing. Any material from the pan dripping from the spoon will run back into the pan through the groove or passage 17. The spoon will be firmly supported on the handle of the pan. Being out of the contents of the pan and positioned so that air may circulate about it, it will not become hot.

It will be clear that with any given size of handle on a pan and with a given size of depression therein, quite a range in size of spoons will be held therein readily.

My improved handle may be provided for pans at low cost and with little change in existing constructions. This is important from a manufacturing standpoint. Also, the arrangement is simple to use and requires no special effort on the part of the user. In fact, rather than requiring additional effort on the part of the user, it is a convenience and time saver, it being easier to place the spoon on the handle of the pan than any other place.

What I claim as new and desire to secure by Letters Patent of the United States, is:

1. A domestic cooking receptacle having a handle provided with a longitudinally extending depression of a contour to receive and hold a spoon.

2. A domestic cooking receptacle having a handle provided with a longitudinally extending depression of a contour to receive and hold a spoon, and means providing a passage connecting the depression with the interior of the receptacle.

3. A domestic cooking receptacle comprising a pan having a recess in its rim and a handle having a longitudinally extending depression of a contour to receive and hold a spoon, the lower end of said handle having walls forming a groove which communicates with said depression, said walls being located in said recess.

4. A domestic cooking receptacle comprising a pan and a handle having ears at its inner end which engage the rim of the pan and are fixed thereto, said handle having a conformation such that it is adapted to receive and hold a spoon on its upper surface.

5. A domestic cooking receptacle comprising a pan and a handle attached thereto, said handle having at its lower end a depression of a contour to receive and hold the bowl of a spoon.

6. The combination with a receptacle of a handle attached thereto having a conformation which provides walls for receiving and holding a spoon and a space to receive substance dripping off a spoon, and means providing a passage which connects the space to the interior of the receptacle.

7. The combination with a receptacle of a handle attached thereto, having a longitudinally extending depression of a contour to receive and hold a spoon and to permit liquid substance in the depression to be discharged into the interior of the receptacle.

HENRY E. BUTLER.